June 3, 1958   C. A. L. RUHL   2,837,117
OPEN CENTER VALVE WITH HOLD FEATURE
Filed Oct. 15, 1956
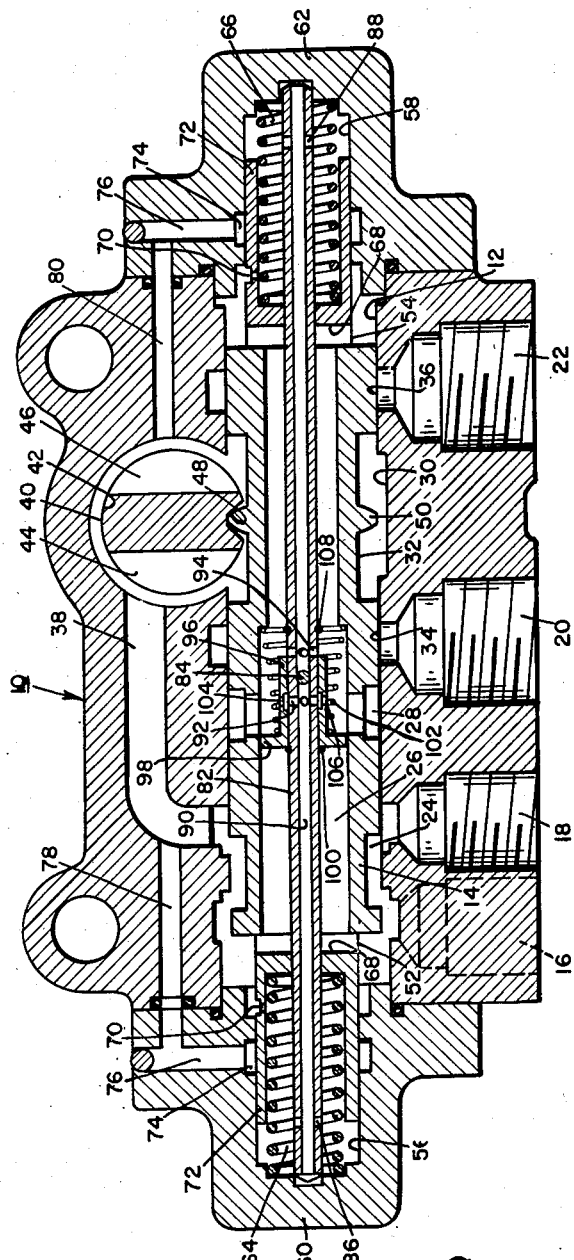
INVENTOR.
CHARLES A.L. RUHL
BY
William P. Hickey
ATTORNEY United States Patent Office 2,837,117
Patented June 3, 1958

2,837,117

OPEN CENTER VALVE WITH HOLD FEATURE

Charles A. L. Ruhl, Kalamazoo, Mich., assignor to Bendix Aviation Corporation, South Bend, Ind., a corporation of Delaware Application October 15, 1956, Serial No. 615,861

9 Claims. (Cl. 137—622.5)

The present invention relates to slide valves generally; and more particularly to means for holding slide valves in their actuating conditions while flow is passing through the valve.

Slide valves are commonly used today to control fluid flows to and from fluid pressure motors such as power lifts and the like. It is desirable in many such applications to provide means in the valve which when the valve is moved into its position actuating the lift, holds the valve in its actuating position until the lift reaches its limit of travel. Numerous prior art devices accomplished this general result; but all such devices with which applicant is familiar either use a separate side stream of fluid to accomplish this result, or throttle the flow of fluid returning from the power lift. In either event considerable energy is wasted; and it is an object of the present invention to provide a new and improved slide valve which holds itself in its actuating condition without either using a separate continuing flow of fluid to accomplish this purpose; or which valve utilizes the force produced by throttling the main flow stream through the valve to hold the valve in its actuating condition.

A further object of the invention is the provision of a new and improved flow control valve having a pair of opposing pressure chambers for controlling movement of its control member, said valve also having valve means therein for regulating the pressure in said opposing pressure chambers to hold the valve in its actuating condition, said valve means being controlled at least in part by a flow sensitive element positioned in the flow stream through said valve.

A further object of the invention is the provision of a new and improved flow control valve of the above described type in which inlet pressure is used in one pressure chamber and exhaust pressure is used in the opposing pressure chamber to hold said valve in its actuating condition.

Further objects and advantages will be apparent to those skilled in the art to which the invention relates from the following description of the preferred embodiment described with reference to the accompanying drawing forming a part of this specification.

The solitary figure of the drawing is a cross-sectional view of a slide valve embodying principles of the present invention—which slide valve is of a type adaptable for use in controlling double acting hydraulic lifts on farm machinery and the like. The valve generally comprises a body member 10 having a longitudinally extending bore 12 therethrough in which is positioned a spool or valve closure member 14 for controlling flow through the valve. Pressure inlet and exhaust ports 16 and 18, respectively, are positioned adjacent each other at one end of the body member with the pressure port being closer to the end of the chamber, and each port communicating with the longitudinal bore 12. The valve body 10 also contains a pair of motor ports 20 and 22 which are spaced from the pressure and exhaust ports and from each other, and which also communicate with the bore 12.

The valve shown in the drawing is of the open center type, and accordingly an annular groove 24 is provided in the outer cylindrical surface of the valve closure member 14 to communicate the pressure and exhaust ports 16 and 18 when the valve closure member is centered in the valve chamber. The valve closure member 14 is adapted to be moved axially to either side of its intermediate position shown in the drawing; and the pressure port 16 communicates with the internal chamber 26 of the valve closure member at all times as will later be explained. Pressure from the internal chamber 26 is communicated to the motor port 20 when the valve closure member is in the right end position through radial openings 28 in the closure member; and is communicated around the right end of closure member 14 to the motor port 22 when the closure member is in its left end position. The motor ports 20 and 22 may be connected to a pair of single acting lift cylinders, but is specifically designed to be connected to the opposite ends of a double acting cylinder such that fluid is returned to one motor port while pressure is being supplied to the other. An annular exhaust groove 30 is provided in the side walls of longitudinally extending chamber 12 between the motor ports 20 and 22; and an annular recess 32 is provided in the valve closure member 14 at such a position as to communicate the motor port 22 to the exhaust groove 30 when the closure member is in its right end position, and to communicate motor port 20 to the exhaust groove 30 when in its left end position. The valve shown is designed to lock hydraulic fluid in the controlled lift cylinder when it is not being actuated; and accordingly land portions 34 and 36 are provided which cover the motor ports 20 and 22, respectively, when the closure member is in its intermediate or center position. Exhaust fluid from the exhaust groove 30 passes through exhaust passageway 38 in the body member to the exhaust port 18, and thence to the exhaust system (not shown) connected to the valve.

The valve closure member 14 might be shifted between its three positions in any suitable manner. This is conveniently accomplished in the device shown in the drawing by a gear and tooth arrangement positioned in the exhaust passageway 38 between the two motor ports 20 and 22. The passageway 38 is enlarged at its point of juncture with exhaust groove 30; and a rotatable shaft 40 is journalled in a transverse bore 42 extending through the enlarged passageway and through both side walls of the valve body. Opposite side portions 44 and 46 of the section of the shaft intermediate the side walls are milled away to facilitate assembly and fluid flow around the shaft, and a gear sector 48 including two teeth and a valley are formed at the bottom of the remaining center section of the shaft 40 for engagement with a single annular tooth 50 machined into the movable valve closure member 14. Rotation of the shaft, therefore, by an external handle, not shown, slides the valve closure member between its three positions.

As previously mentioned, means are provided in the valve shown in the drawing for holding the valve closure member 14 in either of its end positions once the valve closure member 14 has been moved into its end positions and fluid flow is established through the valve. The means shown in the drawing for accomplishing this result comprises a pair of identical cup-shaped piston members 52 and 54, each slidably received in respective cylindrical bores 56 and 58 in identical opposite end caps or closure members 60 and 62, respectively. Identical springs 64 and 66 are positioned in the respective bores 56 and 58 to bias the piston members 52 and 54, respectively, against opposite ends of the valve closure member 14, and so normally hold the closure member 14 in its intermediate position. The piston members 52 and 54 could be made as integral parts of the valve closure member 14; but by making them in the manner described, alignment problems of the end caps relative to the longitudinally extending chamber 12 are eliminated.

Pressure of equal intensity is supplied behind the respective piston members 52 and 54 when the valve closure member 14 is in its intermediate position. The portion of the longitudinally extending chamber 12 between the left end cap 60 and the pressure inlet port 16 is enlarged, and a transverse slot 68 is milled into the end face of the piston member 52 such that inlet pressure is at all times communicated with the internal chamber 26 of the valve closure member 14. The piston member 54 at the other end of the valve is similarly formed; and each are provided with a small opening 70 through their skirts 72 which communicate the opposite sides of each piston member to inlet pressure when the valve closure member 14 is in its center or intermediate position. An exhaust groove 74 is machined in the side walls of the respective bores 56 and 58 of the respective end caps 60 and 62 for the purpose of communicating the opening 70 of the respective piston members 52 and 54 with exhaust pressure when the respective pistons have been forced into the bottom of their receiving bores. A suitable passage 76 communicating with the exhaust groove 74 is provided in each of the caps 60 and 62; and opposite ends of the valve body are drilled at 78 and 80 to communicate these passages with the exhaust passageway 38. It will be seen that the skirts 72 of the piston members 52 and 54 in conjunction with the openings 70 and exhaust grooves 74 act as slide valve means for holding the valve closure member 14 in its end positions—the piston member adjacent the end to which the closure member 14 is moved being vented to exhaust pressure, while the opposite end piston member is subjected to full inlet pressure.

Release of the valve closure member 14 from its end position is obtained after the device being controlled reaches the end of its travel, by still other valve and passage means adapted to again equalize the pressure across the piston members 52 and 54 when flow through the valve ceases. The valve and passage means shown comprise an axially extending tube 82 extending between the opposite end caps 60 and 62 through suitable openings in the piston members 52 and 54 and the internal chamber 26 of the valve. Flow communication directly through the tube 82 is prevented by a nylon plug 84 forced into a transverse bore positioned adjacent the radial openings 28 of the valve closure member 14. A plurality of holes 86 and 88 are drilled in each end of the tube 82 to communicate the piston chambers 56 and 58 with the inside passage 90 of the tube; and communication around the nylon plug 84 is provided by a plurality of holes 92 and 94 through the tube on opposite sides of the plug 84. A flanged sleeve 96 having a flange portion 98 adapted to substantially fill the cross section of the internal chamber 26 and a sleeve portion capable of covering the holes 92 and 94 is positioned around the tube 82. The flange portion 98 is normally held against a stop 100 positioned on the pressure inlet side of the radial flow holes 28 to the motor port 20, by a light coil spring 102; such that all fluid flow to either motor port must pass the flange 98. The end of the sleeve 96 terminates short of the holes 94 in the tube 82 when the sleeve is in engagement with the stop 100; and an annular recess 104 which is communicated with the outer surface of the sleeve by a plurality of holes 106 is positioned in the sleeve 96 for alignment with holes 92 of the tube when the sleeve is so situated. Flow between opposite ends of tube 82 can thus occur through holes 92, recess 104 and holes 106 and 94 when the sleeve 96 abuts stop 100; and flow therebetween will be valved off when the sleeve 96 is moved axially into abutment with a stop 108, in which position the holes 92 and 94 are covered by the sleeve. In this latter position the flange 98 will be positioned centrally of the radial openings 28 in the valve closure member 14 so as to offer practically no resistance to fluid flow either through the radial openings 28 to the motor port 20, or around the flange to the motor port 22.

In the normal position shown in the drawing, the valve closure member 14 is held in its center or intermediate position by the coil springs 64 and 66. In this position fluid from the inlet port 16 is communicated directly to the exhaust port 18 such that practically no pressure exists in the valve. Equal pressure is communicated to the opposite piston chambers 56 and 58 through slot 68, openings 70, and tube 82 (the holes 92 and 94 being uncovered by the sleeve 96); and land portions of the valve closure member 14 lock fluid in the motor ports 20 and 22.

When it is desired to raise or lower the controlled device, the valve handle (not shown) is angularly displaced to rotate the shaft 40; thereby moving the valve closure member into one of its end positions. (Let us assume that flow out of the motor port 22 raises the controlled device and that the valve closure member 14 has been moved to its left end position with the skirt 72 in abutment with the end of the bore 56 in the cap 60.) In its left end position, the valve closure member closes off the exhaust port 18 from the pressure inlet port 16, and pressure is immediately built up in the central valve chamber 26 through slot 68 in piston 52. At the same time, motor port 20 is communicated to the exhaust passage 40 by recess 32; and the motor port 22 is uncovered such that it communicates with the central valve chamber 26 through slot 68 in piston 54. Fluid flow immediately commences through the central valve chamber 26 forcing the flanged sleeve 96 against its stop 108 such that its flange 98 is approximately centered with respect to the radial openings 28. Fluid therefore is free to flow around the flange 98 with very little resistance and proceeds to slot 68 in piston 54 and thence out through motor port 22.

Flow through the valve holds the flanged sleeve 96 against the stop 106; and in this position, the sleeve 96 closes off holes 92 and 94 to prevent pressure communication between the piston chambers 56 and 58 through tube 82. In the valve's left end position, the left end piston chamber 56 is communicated to the exhaust passages 78 and 38 through the opening 70 in the left end piston 52; and the right end piston chamber 58 is communicated to inlet pressure through the opening 70 in the right end piston 54 and its slot 68. Pressure unbalance is therefore produced across the valve closure member 14, and it is held in its left end position until flow ceases.

While pressure flow out through motor port 22 takes place, return flow from the controlled device enters motor port 20 to annular groove 30 and thence flows through exhaust passageway 38 to the exhaust port 18. It should further be pointed out that spring 102 is very light such that it produces very little pressure drop across the flanged sleeve 96.

When the controlled device reaches the end of its stroke, flow through the valve ceases, and spring 102 forces the flanged sleeve 96 to its normal or open position. In this position the holes 92 and 94 are uncovered and the piston chambers 56 and 58 are again communicated through the tube 82. Pressure from the right end piston chamber 58 flows through the tube to the left end chamber 56 to equalize the pressure in the piston chambers and thereby permit spring 64 to return the valve closure member 14 to its center position. It should be noted that the openings 70 in the pistons 52 and 54 have a much smaller flow capacity than does the flow passageway through the tube 82, such that pressure in the piston chambers can equalize sufficiently to permit spring 64 to move the valve closure member 14.

Movement of the valve closure member into its right end position produces a similar operation which will be apparent to those skilled in the art—and in which position, flow proceeds out motor port 20 and returns through motor port 22. Suffice it to say that in this position the left end land of the valve closure member 14 closes off direct communication between the pressure and exhaust ports 16 and 18; pressure flow proceeds through radial openings 28 to motor port 20; and return flow from motor port 22 proceeds through annular recess 32 to the exhaust passageway 38. The flanged sleeve 96 will again be moved to its right or closed position such that inlet pressure now exists in the left piston chamber 56 and exhaust pressure in the right piston chamber 58 to hold the valve closure member in its right end position. When flow through the valve ceases, the flanged sleeve again returns to its left or open position to permit the valve to again center itself in a manner analogous to that previously described for return movement from the valve's left end position.

It will be apparent that the objects heretofore enumerated, as well as others, have been accomplished, and that there has been provided a valve which holds itself in its controlled device actuating condition while fluid flows through the valve, without producing an appreciable pressure loss in the fluid flowing through the valve. It will further be apparent that while the full pressure differential between inlet and exhaust pressures is used in the preferred embodiment to hold the valve in its open position, that other smaller pressure differentials might be used, although larger differential pressure surfaces would have to be used.

While the preferred embodiment has been shown and described as utilizing a tube between its opposite end piston chambers to equalize the pressure therebetween when flow through the valve ceases, other arrangements may be utilized. Flow passages might be used to communicate the pressure inlet port directly to the opposite end piston chambers, and suitable flow sensitive valving utilized to control flow communication through these passages in a manner similar to that previously described.

While the invention has been described in considerable detail, I do not wish to be limited to the particular constructions shown or described; and it is my intention to cover hereby all adaptations, modifications, and uses thereof which come within the practice of those skilled in the art to which the invention relates.

I claim:

1. In a slide valve: a body having a valve chamber therein; a slide in said valve chamber constructed and arranged to communicate a pressure supply to a controlled device when in one position and to close off communication therebetween when in another position, said slide being urged into said other position; a movable wall in said valve, said movable wall having opposing surfaces upon one of which surfaces the pressure supply is continually communicated, said movable wall permitting said slide to be moved to its closed position when substantially equal pressure exists on its opposing surfaces, and to prevent said slide from being moved out of its open position when a lower pressure is communicated with the other opposing surface of said movable wall; first valve and passage means communicating said other opposing surface of said movable wall to said pressure supply when said slide is in its closed position and communicating said other opposing surface to a lower pressure when said slide is in its open position; second passage means for communicating said pressure supply to said other opposing surface of said movable wall; and normally open valve means in said second passage means constructed and arranged to be closed by fluid flows through said slide valve; whereby pressure differential is produced across said movable wall when fluid flow is experienced in said slide valve, thereby causing said slide to be held in its open position, and whereby the pressure is equalized across said movable wall when flow through said slide valve ceases, to permit slide to return to its closed position.

2. In a slide valve: a body member having a valve chamber therein; a slide in said valve chamber constructed and arranged to communicate a pressure supply port to one exit port when in one end position, to communicate said pressure supply port to another exit port when in the opposite end position, and to isolate said ports when in an intermediate position, said slide being biased to its intermediate position; a pair of expansible chambers having opposing movable walls operatively connected to said slide; first valve and passage means communicating said expansible chambers to the same pressure when said slide is in its intermediate position and communicating said chambers to pressures of sufficiently different intensity to hold said slide in either end position when the slide is so positioned; and second valve and passage means for communicating said expansible chambers, said means closing off communication therethrough when flow exists through the slide valve and opening communication therethrough when flow through the slide valve ceases.

3. In a slide valve: a body member having a valve chamber therein; a slide in said valve chamber constructed and arranged to communicate a pressure supply port to one exit port when in one end position, to communicate said presure supply port to another exit port when in the opposite end position, and to isolate said ports when in an intermediate position; means biasing said slide to its intermediate position; a pair of expansible chambers having opposing movable walls operatively connected to said slide; first valve and passage means communicating said expansible chambers to the same pressure when said slide is in its intermediate position and communicating said chambers to pressures of sufficiently different intensity to hold said slide in either end position when the slide is so positioned; second passage means communicating said expansible chambers; valve means in said second passage means; and means for actuating said last mentioned valve means, said means being sensitive to flow through said slide valve and being constructed and arranged to close said last mentioned valve means when flow exists through said slide valve and to open communication therethrough when flow ceases through said slide valve.

4. In a slide valve: a body member having a valve chamber therein; a slide in said valve chamber constructed and arranged to communicate a pressure supply port to one exit port when in one end position, to communicate said pressure supply port to another exit port when in the opposite end position, and to isolate said ports when in an intermediate position; means biasing said slide to its intermediate position; a pair of expansible chambers having opposing movable walls positioned at opposite ends of said slide the respective chambers being diminished in size when said slide is moved in their respective direction; first valve and passage means communicating both expansible chambers to the pressure supply when said slide is in its intermediate position and when the slide is in an end position to communicate the adjacent end chamber which is diminished in size to an exhaust pressure to hold said slide in its end position; second passage means communicating said expansible chambers; valve means in said second passage means; means positioned in the flow stream between said supply and exit ports for actuating said last mentioned valve means, said means being sensitive to flow through said slide valve and being constructed and arranged to close said last mentioned valve means when flow exists through said slide valve and to open communication therethrough when flow ceases through said slide valve.

5. In a slide valve: a body member having a valve chamber therein; a slide in said valve chamber constructed and arranged to communicate a pressure supply port to one exit port when in one end position, communicate said pressure supply port to another exit port when in the opposite end position, and to isolate said ports when in an intermediate position, said slide being biased to its intermediate position; a pair of movable walls arranged to oppose each other in said valve; means communicating a pair of opposing faces on respective movable walls to said pressure supply; first valve and passage means normally communicating the other pair of opposing faces of the respective movable walls to pressures of substantially the same intensity when said slide is in its intermediate position, and communicating said other pair of faces when said slide is in either of its end positions to pressures of sufficiently different intensities to hold said slide in its end position; second passage means communicating said other pair of movable wall faces; and second valve means in said passage means preventing communication through said second passage means when flow exists through said slide valve and permitting equalization of pressure on said other pair of faces when flow through said slide valve ceases.

6. In a slide valve: a body member having a pressure, exhaust, first and second motor ports connected by a valve chamber; a movable slide in said chamber adapted when in its center position to close communication between said motor and pressure ports, when in one end position to communicate pressure to said first motor port, and when in its opposite end position to communicate pressure to said second motor port, said slide being biased to its intermediate position; a pair of expansible chambers respective ones of which are positioned at respective ends of said slide and each being diminished in size when said slide is moved in its direction; first valve and passage means communicating both expansible chambers when said slide is in its intermediate position, and communicating the adjacent diminished expansible chamber to a pressure which is lower than in the other expansible chamber when said slide is in an end position to hold said slide in its end position; second passage means for communicating pressure to said expansible chambers; valve means in said second passage means; means positioned in the flow stream between said supply and exhaust ports for actuating said valve means, said means being sensitive to fluid flow through the valve, and said valve means and second passage means being adapted to isolate pressure from the expansible chambers when diminished in size and flow against said means exists, and to communicate pressure to the diminished expansible chambers when flow against said means ceases.

7. In a slide valve: a body member having a pressure, exhaust, first and second motor ports connected by a valve chamber; a movable slide in said chamber adapted when in its center position to close communication between said motor and pressure ports, when in one end position to communicate pressure to said first motor port, and when in its opposite end position to communicate pressure to said second motor port, said slide being biased to its intermediate position; a pair of expansible chambers respective members of which are positioned at respective ends of said slide and each being diminished in size when said slide is moved in its direction; first valve and passage means communicating both expansible chambers with said pressure port when said slide is in its intermediate position, and when said slide is in an end position to communicate the adjacent diminished expansible chamber to said exhaust port to hold said slide in its end position; second passage means for communicating said pressure port to said expansible chambers; valve means in said second passage means; means positioned in the flow passage between said supply and motor ports for actuating said valve means, said means being sensitive to flow to said motor ports, and said valve being adapted to isolate pressure from said diminished expansible chamber when flow to the motor ports exist, and to communicate pressure to said diminished expansible chamber when flow to the motor port ceases.

8. In a slide valve: a body member having a pressure, exhaust, first and second motor ports connected by a valve chamber; an annular valve closure member in said valve chamber constructed and arranged such that fluid flows through its central chamber on its way from said pressure port to said motor ports, said closure member being adapted to communicate said first motor port with said pressure port when in a first end position, to communicate said second motor port with said pressure port when in a second end position, and to isolate both motor ports from said pressure port when in an intermediate position; first and second movable walls in opposite ends of said valve chamber forming first and second opposite end pressure chambers and being constructed and arranged to move with said valve closure member; a spring in each of said pressure chambers biasing said movable walls towards each other and said valve closure member to its intermediate position; slide valve means carried by said movable walls for communicating supply pressure to said first and second pressure chambers when said valve closure member and movable walls are in their intermediate positions, communicating said first end pressure chamber to said exhaust port when they are in their first end positions, and communicating said second end pressure chamber to said exhaust port when they are in their second end positions; a longitudinally extending tubular member passing through said movable walls and said central chamber of said annular valve closure member for communicating the opposite end first and second pressure chambers; valve means cooperating with said tubular member for opening and closing communication between said end pressure chambers; flow detecting means in said central chamber of said movable valve member and adapted to move said valve means to its closed position when flow exists; and means biasing said valve means to its open position when no flow exists through said central chamber.

9. In a slide valve: a body member having a pressure, exhaust, first and second motor ports connected by a valve chamber; an annular valve closure member in said valve chamber and having a first passage therein continually communicating its central chamber with said pressure port and being constructed and arranged such that fluid flows through its central chamber on its way from said pressure port to said motor ports, said closure member being adapted to communicate said first motor port with said pressure port when in a first end position, to communicate said second motor port with said pressure port when in a second end position, and to isolate both motor ports from said pressure port when in an intermediate position; first and second movable walls in opposite ends of said valve chamber forming first and second opposite end pressure chambers and being constructed and arranged to move with said valve closure member; a spring in each of said pressure chambers biasing said movable walls towards each other and said valve closure member to its intermediate position; slide valve means carried by said movable walls for communicating supply pressure to said first and second pressure chambers when said valve closure member and movable walls are in their intermediate positions, communicating said first end pressure chamber to said exhaust port when they are in their first end positions, and communicating said second end pressure chamber to said exhaust port when they are in their second end positions; a longitudinally extending tubular member passing through said movable walls, and said central chamber of said annular valve closure member for communicating the opposite end first and second pressure chambers; an obstruction in said tubular member, a flanged sleeve surrounding said tubular member in the region overlying said obstruction with its flange portion in the flow stream of said annular valve closure member, means biasing said sleeve to a normal position and permitting said sleeve to be moved to a second position down stream from said first position by fluid flow through said annular valve closure member, said sleeve and said tubular member having openings therethrough on each side of said obstruction which are aligned when said sleeve is in its first position to pass fluid through said tubular member, and which openings are moved out of alignment when said sleeve is in its second position to prevent communication through said tubular member.

References Cited in the file of this patent
UNITED STATES PATENTS 2,743,708    Lunderhausen _____ May 1, 1956